Figures 1, 2:
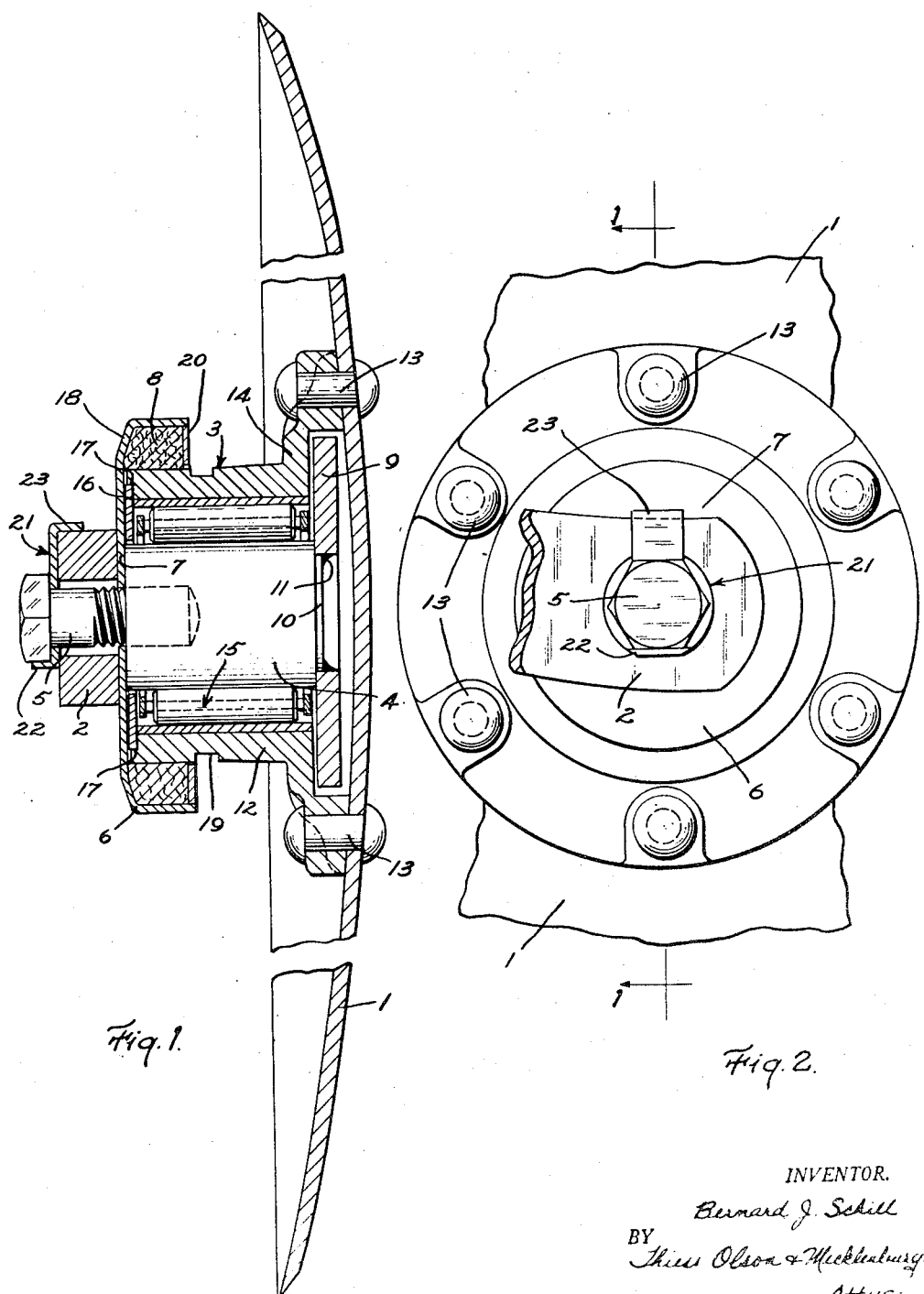

Jan. 30, 1951 B. J. SCHILL 2,539,866
CUTTING DISK BEARING
Filed Sept. 20, 1946

INVENTOR.
Bernard J. Schill
BY Thiess Olson & Mecklenburger
Attys.

Patented Jan. 30, 1951

2,539,866

UNITED STATES PATENT OFFICE 2,539,866

CUTTING DISK BEARING

Bernard J. Schill, Rockford, Ill., assignor to J. I. Case Company, Racine, Wis., a corporation of Wisconsin Application September 20, 1946, Serial No. 698,120

7 Claims. (Cl. 308—181)

My invention relates to a dustproof antifriction bearing construction for cutter discs.

One of the objects of my invention is to provide an improved dustproof antifriction bearing construction for mounting the cutting disc on its bracket.

A further object is to provide such a construction having an oil seal holding cup-like collar having a flange portion clamped between the inner end of the axle and the bearing bracket.

A further object of my invention is to provide improved means for holding the antifriction roller bearing against excessive endwise movement.

Further objects and advantages of the invention will appear from the description and claims.

In the drawings in which an embodiment of my invention is shown,

Figure 1 is an axial sectional view of the disc, axle stud, antifriction bearing and oil seal; and Fig. 2 is a view from the left of Fig. 1.

Referring to the drawings in detail, the construction shown comprises a cutting disc 1, a bearing supporting bracket 2, and a dustproof antifriction bearing construction 3 for mounting the cutting disc on the bracket.

The nonrotatable parts of this construction comprise the bearing supporting bracket 2, an axle stud 4 secured to this bracket by a clamping bolt 5 extending through an opening in the bracket and threaded into the axle stud 4, a metal seal holding cup-like collar 6 having a flange portion 7 clamped between the inner end of the axle 4 and the bearing bracket 2, an oil seal ring 8 of felt or other suitable material held in the cup-holding collar 6, and an annular metal thrust plate or collar 9 fitting on the reduced portion 10 of the axle 4 and secured thereto in any suitable manner as by welding at 11.

The rotatable parts include the cutting disc 1, a hub portion 12 riveted to the cutting disc at 13 having a flange portion 14 between which and the cutting disc 1 the thrust collar 9 on the axle stud extends, an antifriction bearing 15 between the hub 12 and axle stud 4 and a steel bearing retaining washer 16 having a press fit engagement with the hub at 17 for preventing the antifriction bearing 15 from working out and wearing against the flange 7 of the seal-holding collar.

The bearing 15 is to be packed with grease at the time of assembly and requires no other attention. When the felt seal ring 8 is worn out the bearing can be taken apart by removing the bolt 5, cleaned with any grease solvent, repacked with grease and a new felt ring put in place. Many hours of labor can be saved by not having to grease this bearing twice each day as is required for the ordinary disc bearing.

The enclosure for the felt is constructed with a taper at its outer diameter at 18 which tends to force the felt toward the wearing surface of the hub and keeps it dust-tight. There is also a groove 19 in the hub 12 which is flush with the vertical wall 20 of the collar 6, which eliminates any horizontal surface where dirt can lodge and enter the bearing.

In order to prevent the clamping bolt or screw 5 from becoming loosened, a locking strap 21 is provided having a hole through which the shank of the screw 5 extends, an in-turned finger 22 which engages one side of the hexagonal head of the screw, and a bendable finger portion 23 which extends upwardly, the end of which may be bent over the upper edge of the mounting bracket 2 when the screw 5 has been turned up tightly into the axle stud 4.

Further modifications will be apparent to those skilled in the art and it is desired, therefore, that the invention be limited only by the scope of the appended claims.

Having thus described my invention, what I claim and desire to secure by Letters Patent is:

1. A cutting disc and bearing construction comprising a cutting disc, a bearing supporting bracket, and a dustproof antifriction bearing construction for mounting the cutting disc on the bracket, the nonrotatable parts of this construction comprising the bearing supporting bracket, an axle stud, a clamping bolt extending through an opening in the bracket and threaded into the axle stud, a seal holding cup-like collar having a flange portion clamped between the inner end of the axle and the bearing bracket, an oil seal ring held in the seal-holding collar, an annular thrust plate secured to the axle stud, the rotatable parts including the cutting disc, a hub portion secured to the cutting disc having a flange portion between which and the cutting disc the thrust plate on the axle stud extends, an antifriction bearing between the hub and axle stud and a bearing retaining washer secured to the hub for preventing the antifriction bearing from working out and wearing against the flange of the seal-holding collar.

2. A cutting disc and bearing construction comprising a cutting disc, a bearing supporting bracket, and a dustproof antifriction bearing construction for mounting the cutting disc on the bracket, the nonrotatable parts of this construction comprising the bearing supporting bracket, an axle stud secured to this bracket, a seal holding cup-like collar having a flange portion clamped between the inner end of the axle and the bearing bracket, an oil seal ring held in the cup-holding collar, and an annular thrust plate or collar secured to the axle stud, the rotatable parts including the cutting disc, a hub portion secured to the cutting disc having a flange portion between which and the cutting disc the thrust collar on the axle stud extends, an antifriction bearing between the hub and axle stud and a bearing retaining washer secured to the hub for preventing the antifriction bearing from working out and wearing against the flange of the seal-holding collar.

3. A cutting disc and bearing construction comprising a cutting disc, a bearing supporting bracket, and a dustproof antifriction bearing construction for mounting the cutting disc on the bracket, the nonrotatable parts of this construction comprising the bearing supporting bracket, an axle stud secured to this bracket, a seal holding cup-like collar having a flange portion clamped between the inner end of the axle and the bearing bracket an oil seal ring held in the seal-holding collar, the rotatable parts including the cutting disc, and a hub portion secured to the cutting disc, and an antifriction bearing between the hub and axle stud.

4. In a grain drill or the like having a disc cutter and a mounting bracket therefor having a hole therethrough, antifriction bearing means for mounting said cutter on said bracket comprising a bearing pin having means extending through said hole for securing it to said bracket, a hub surrounding said pin and spaced therefrom and having an outwardly-extending flange secured to said disc so as to provide an annular space between the end of said hub and said disc, a collar fixedly secured to the end of said bearing pin and extending into said annular space to provide an end thrust member, and a roller bearing assembly between said bearing pin and hub held against endwise movement in one direction by said collar, the central portion of said disc cutter extending across the end of the bearing pin, and said hub, collar and bearing assembly lying in the space between the central portion of said disc cutter and said mounting bracket.

5. In a grain drill or the like having a disc cutter and a mounting bracket therefor, antifriction bearing means for mounting said cutter on said bracket comprising a bearing pin secured to said bracket, a bearing hub surrounding said pin and spaced therefrom and having an outwardly-extending flange secured to said disc so as to provide an annular space between the end of said hub and said disc, a collar fixedly secured to the end of said bearing pin and extending into said annular space to provide an end thrust member, and a roller bearing assembly between said bearing pin and hub held against endwise movement in one direction by said collar, the central portion of said disc cutter extending across the end of the bearing pin, and said hub, collar and bearing assembly lying in the space between the central portion of said disc cutter and said mounting bracket.

6. In a grain drill or the like having a disc cutter and a mounting bracket therefor, antifriction bearing means for mounting said cutter on said bracket comprising a bearing pin secured to said bracket, a bearing hub surrounding said pin and spaced therefrom and having an outwardly-extending flange secured to said disc so as to provide an annular space between the end of said hub and said disc, a collar fixedly secured to the end of said bearing pin and extending into said annular space to provide an end thrust member, a roller bearing assembly between said bearing pin and bearing hub held against endwise movement in one direction by said collar, and a thrust collar secured to said hub and surrounding said pin for holding said assembly against endwise movement in the opposite direction, the central portion of said disc cutter extending across the end of the bearing pin, and said hub, collar and bearing assembly lying in the space between the central portion of said disc cutter and said mounting bracket.

7. In a grain drill or the like having a disc cutter and a mounting bracket therefor, antifriction bearing means for mounting said cutter on said bracket comprising a bearing pin secured to said bracket, a bearing hub surrounding said pin and spaced therefrom and having an outwardly-extending flange secured to said disc so as to provide an annular space between the end of said hub and said disc, a collar fixedly secured to the end of said bearing pin and extending into said annular space to provide an end thrust member, an anti-friction bearing assembly between said bearing pin and bearing hub held against endwise movement in one direction by said collar, and a thrust collar secured to said hub and surrounding said pin for holding said assembly against endwise movement in the opposite direction, the central portion of said disc cutter extending across the end of the bearing pin, and said hub, collar and bearing assembly lying in the space between the central portion of said disc cutter and said mounting bracket.

BERNARD J. SCHILL.

REFERENCES CITED

The following references are of record in the file of this patent:

UNITED STATES PATENTS

| Number | Name | Date |
|---|---|---|
| 885,080 | Pelton | Apr. 21, 1908 |
| 1,405,033 | Heylman | Jan. 31, 1922 |